United States Patent [19]

Sato et al.

[11] Patent Number: 4,486,084
[45] Date of Patent: Dec. 4, 1984

[54] LIGHT SHIELD BLADES FOR LIGHT CONTROL DEVICE AND LIGHT CONTROL DEVICE UTILIZING SAID LIGHT SHIELD BLADES

[75] Inventors: Akihiko Sato, Kawasaki; Yoshiyuki Nakano; Etsuo Tanaka, both of Tokyo, all of Japan

[73] Assignee: Nippon Kogaku K.K., Tokyo, Japan

[21] Appl. No.: 422,951

[22] Filed: Sep. 24, 1982

[30] Foreign Application Priority Data

Dec. 7, 1981 [JP] Japan ............................. 56-196654
Feb. 1, 1982 [JP] Japan ............................. 57-13339

[51] Int. Cl.³ ............................................. G03B 9/40
[52] U.S. Cl. .................................. 354/246; 354/249; 354/250; 354/264; 354/274
[58] Field of Search ............... 354/226, 245, 246, 250, 354/261, 264, 270, 274, 241, 242, 243, 244, 249; 350/266, 271, 272, 449, 450

[56] References Cited

U.S. PATENT DOCUMENTS 3,685,423  8/1972  Dahlgren .................... 354/241
4,044,367  8/1977  Dahlgren .................... 354/242
4,141,634  2/1979  Inoue ........................ 354/246
4,298,265 11/1981  Tanaka et al. ............... 354/246

Primary Examiner—A. A. Mathews
Attorney, Agent, or Firm—Shapiro and Shapiro

[57] ABSTRACT

A light-shielding blade for use in a light control device, comprises a flat area and a recessed area on each face. The recessed area on one face is positioned substantially corresponding to the flat area on the other face. The light control device is for controlling a light-passing aperture and comprises a blade group composed of plural light-shielding blades movable between an extended state in which the plural blades are extended in a partially overlapping condition and a superposed state in which the plural blades are stacked in a substantially overlapping state. The blade group comprises at least a blade provided with a flat area and a recessed area on each face thereof. The recessed area on one face is positioned substantially corresponding to the flat area on the other face, and at least one of the flat areas is in overlapping contact with a neighboring blade in said extended state of the blade group.

18 Claims, 25 Drawing Figures

FIG. 4A  FIG. 4A'
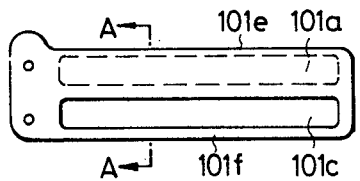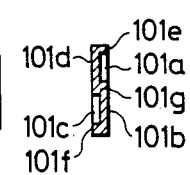
FIG. 4B  FIG. 4B'
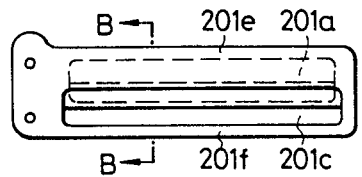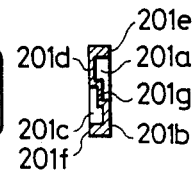
FIG. 4C  FIG. 4C'
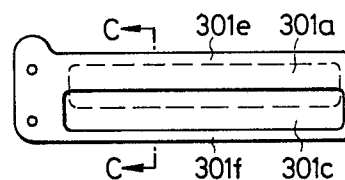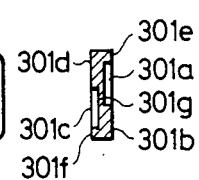
FIG. 5A  FIG. 5B
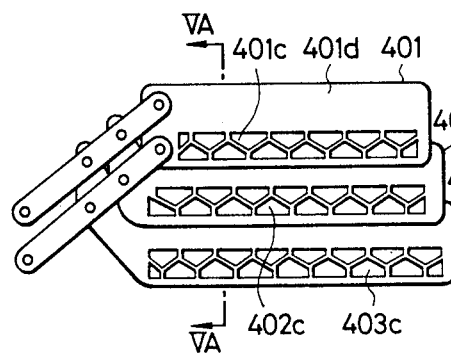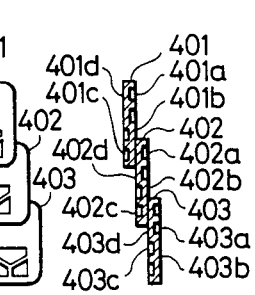

LIGHT SHIELD BLADES FOR LIGHT CONTROL DEVICE AND LIGHT CONTROL DEVICE UTILIZING SAID LIGHT SHIELD BLADES

BACKGROUND OF THE INVENTION

1. Field of the Invention

The present invention relates to light shield blades for a light control device, and more particularly to an improvement on the light shield blades for use in a light control device for closing or reducing a light-passing aperture with plural blades such as a shutter or an automatic diaphragm, and to a light control device utilizing said light shield blades.

2. Description of the Prior Art

Mechanical light control devices, such as the shutter or automatic diaphragm employed in photographic cameras, include plural shield blades formed of a metal or a plastic material. High-speed movement of said blades improves the accuracy of short exposure times and allows synchronization of the electronic flash even in a short exposure time. Also reduced driving force required for the shutter or automatic diaphragm provides the advantages of easier film winding and longer service life of the shutter or diaphragm. The mass of the shield blades has to be decreased in order to achieve high-speed movement of the blades with reduced driving force, and, for this purpose it has been proposed, for example in the U.S. Pat. No. 4,298,265, to reduce the thickness of the blade on one or both faces thereof, while leaving the rim portion unchanged. Such thickness reduction, if applied on one face of the blade, will however cause bending of the blade because of the unbalanced residual stress, thus increasing the friction resistance between the blades or causing deterioration of the close contact between the overlapping blades, eventually giving rise to a defective light-shielding ability. On the other hand, in case of a blade with thickness reduction on both faces thereof, the rim portion thereof will no longer be in contact with the rim portion of another blade in the course of blade movement but will overlap with the thickness reduced area of the other blade, and the gap generated between said rim portion and said thickness reduced area will cause light leaking.

SUMMARY OF THE INVENTION

An object of the present invention is to provide light shield blades which avoid the aforementioned drawbacks of the conventional blades, are lighter in weight while ensuring satisfactory light tightness, and allow high-speed movement due to the absence of distortion, and to provide a light control device utilizing said shield blades.

BRIEF DESCRIPTION OF THE DRAWINGS

FIGS. 2A, 2B, 2C, 2A', 2B' and 2C' are views showing the function of said first embodiment wherein FIGS. 2A, 2B and 2C are plan views while FIGS. 2A', 2B' and 2C' are cross-sectional views;

FIGS. 4A, 4B, 4C, 4A', 4B' and 4C' are views showing principal components used in said first embodiment, wherein FIGS. 4A, 4B and 4C are plan views while FIGS. 4A', 4B' and 4C' are cross-sectional views;

FIG. 5A is a plan view of a third embodiment of the present invention;

FIG. 5B is a cross-sectional view thereof;

DETAILED DESCRIPTION OF THE PREFERRED EMBODIMENTS

Now the present invention will be clarified in detail by the embodiments thereof shown in the attached drawings.

Figure 1A:
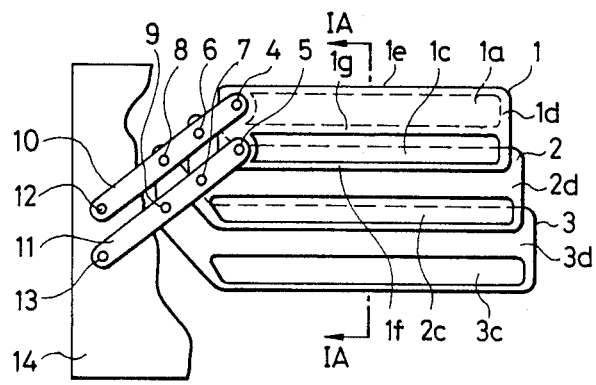
FIG. 1A is a plan view of a first embodiment of the present invention.

FIG. 1 shows an embodiment of the light shield blades of the present invention, applied to a so-called square focal plane shutter in which plural rectangular blades run vertically in an exposing aperture of a camera, thereby opening and closing said aperture. As already known, such square focal plane shutter is generally provided with another set of similar shield blades positioned across the exposing aperture, but said another set of blades is omitted from the drawing as it is substantially symmetric to that shown in FIG. 1A.

Figure 1B:
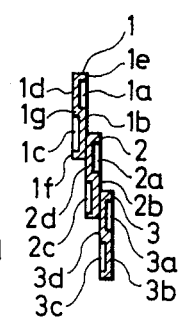
FIG. 1B is a cross-sectional view of the embodiment shown in FIG. 1A along a line IA—IA therein.

In FIGS. 1A and 1B three blades are extended to entirely close the aperture, wherein a first blade 1, a second blade 2 and a third blade 3 are articulated, through pins 4, 5, 6, 7, 8 and 9, to two levers 10, 11 which are rotatably supported respectively by shafts 12, 13 on a shutter base plate 14. As the pins 4, 5 and shafts 12, 13 are so positioned as to form a parallelogram, the first blade 1, levers 10, 11 and base plate 14 constitute a parallelogrammic link for causing the parallel displacement of the first blade 1 in response to the rotation of the levers 10, 11. The second and third blades 2, 3, constituting a part of similar links, performs parallel displacement with the first blade 1. However the amount of the displacement, being proportional to the length of each lever from the shaft 12 to the pin 4, 6 or 8, is largest at the first blade 1 and smallest at the third blade 3. Each blade has a pair of opposite faces. The first blade 1 is provided on one face thereof with a recessed area 1a for thickness reduction and a flat area 1b, and on the other face thereof with a recessed area 1c and a flat area 1d, wherein the recessed areas 1a, 1c are respectively opposite to the flat areas 1d, 1b. Also the second blade 2 is provided on both faces thereof with recessed areas 2a, 2c respectively opposite to flat areas 2d, 2b in the same manner as in the first blade 1, and the third blade 3 is similarly provided with recessed areas 3a, 3c respectively opposite to flat areas 3d, 3b. When the blades are extended as shown in FIG. 1, the flat area 1b of the first blade and the flat area 2d of the second blade (on adjacent faces) are in a mutual overlapping contact, and the other flat area 2b of the second blade and the flat area 3d of the third blade (on adjacent faces) are also in a mutual overlapping contact.

Figure 2A:
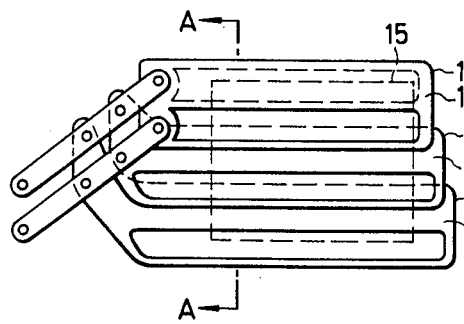
Figure 2A:
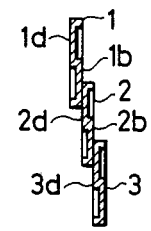

In the following the function of the shield blades shown in FIG. 1 is explained. FIG. 2A shows the blades in the same extended state as shown in FIG. 1, wherein the three blades 1, 2, 3 are overlappingly extended to entirely close the aperture 15.

Figure 2B:
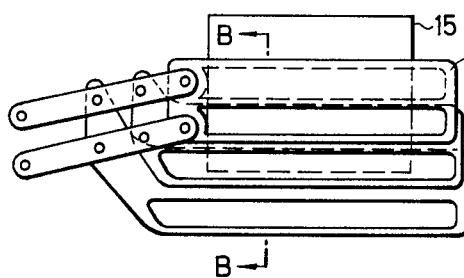
Figure 2B:
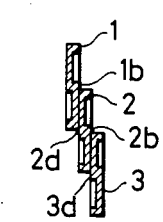
Figure 2C:
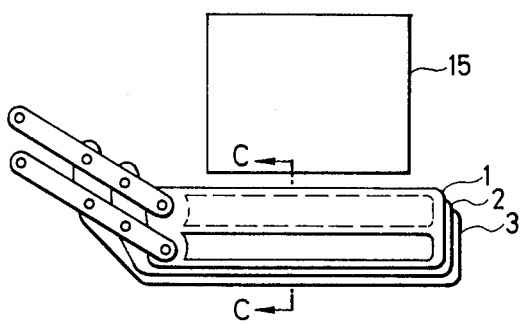
Figure 2C:
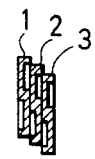

In this state easy sliding movement of the blades is assured since the relatively large overlapping width of the substantially planar and now recessed areas 1b and 2d or 2b and 3d prevents light leakage even if said flat areas are not in close contact. FIGS. 2B and 2B' show the states of blades in the course of exposure during which the blades are moving, or in the course of film winding operation during which the shutter is charged to a state before exposure. If FIG. 2B shows the state during exposure, the eventual slight leakage of light through the overlapping areas of the blades does not practically affect the photographic film since the blades pass the aperture within a very short time in the order of 1/100 second. On the other hand, if FIG. 2B shows the state during the shutter charging, the eventual light leak through the overlapping areas will affect the photographic film since the blades are moving slowly. In the present embodiment, however, the overlapping between the flat areas 1b and 2d or 2b and 3d becomes wider in the state of FIG. 2B' than in the state of FIG. 2A, so that such light leakage can be prevented even if the mutual contact of overlapping areas is less complete than before the shutter releasing shown in FIG. 2A. FIGS. 2C and 2C' show a state where the blades 1, 2, 3 mutually overlap completely outside the aperture 15. In this state the overlapping width of the flat areas is, as shown in FIG. 2C', smaller than that in the state of FIG. 2A', but light leakage is no longer a problem since the blades are already out of the aperture. In this state, the other set of shield blades (not shown) positioned symmetrically is extended after a determined time to a state as shown in FIG. 2A to close the aperture 15. Consequently light leakage can be prevented if the other set of blades is structured in the same manner as shown in FIG. 1.

In the foregoing is explained the importance of the width of flat areas of the blades for preventing light leakage. Now there will be given an explanation of the recessed areas for thickness reduction formed on the blades. As shown in FIGS. 1A and 1B, the recessed areas 1a, 1c of the first blade, or 2a, 2c of the second blade, or 3a, 3c of the third blade are respectively formed on the opposite faces and are mutually bounded at the approximate center in the width of each blade, thus reducing the thickness between the bottom of each recessed area and the flat area on the opposite face. Since the outer rims, for example 1e, 1f around the recessed areas and the partition, for example 1g, between the recessed areas have a small width, the amount of reduced mass is equal to or larger than that in the conventional blade structure in which the thickness is reduced over substantially the entire surface except thin rim portions. Still the blade of the present embodiment can be provided with sufficiently wide flat areas for mutual overlapping contact of the blades for preventing light leakage, in contrast to the conventional thin rim portions. Also in case of a metal blade usually made of a thin plate, the hardening treatment required for attaining the required strength generates an internal stress, so that the thickness reduction will result in bending of a conventional blade because of unbalanced internal stress. In the present embodiment, however, the internal stress is considerably balanced because of the recessed areas are formed on both faces, whereby bending is reduced to a practically negligible extent. Also the third blade may be an ordinary blade of a uniform thickness without the recessed areas 3a, 3c since the movement of said blade is relatively slow. Furthermore the number of the blades with recessed areas may be arbitrarily selected according to the design need.

Figure 3:
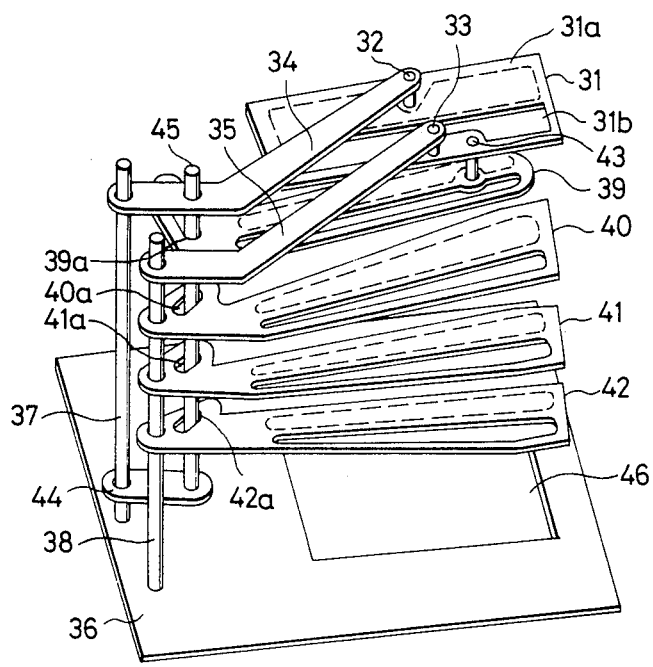
FIG. 3 is a perspective view of a second embodiment of the present invention.

FIG. 3 shows another embodiment of the present invention applied to a shutter different from the square focal plane shutter shown in FIG. 1.

In this embodiment a first blade 31 is rotatably connected to levers 34, 35 through pins 32, 33 fixed on said blade. The levers 34, 35 are rotatably supported by shafts 37, 38 fixed on a shutter base plate 36. Since the pins 32, 33 and the shafts 37, 38 substantially constitute a parallelogram, the first blade 31 performs parallel displacement in the same manner as in the embodiment shown in FIG. 1 by the rotational movement of the levers 34, 35. However the movement of second, third, fourth and fifth blades 39, 40, 41, 42 is different from that of the first blade. A pin 43 fixed on the first blade 31 rotatably engages with the second blade 39, which is provided at a part thereof with a cam groove 39a engaging with a pin 45 fixed on an arm 44 rotatably supported by the shaft 37, so that the movement of the second blade 39 is defined by the movement of the pin 45 and the shape of cam groove 39a through the pin 43. Also the third blade 40 is rotatably supported by the shaft 38, and is provided at a part thereof with a cam groove 40a engaging with the pin 45. The fourth and fifth blades 41, 42 are similarly supported rotatably by the shaft 38 and are respectively provided with cam grooves 41a, 42a engaging with the pin 45. The pin 45 is rotatably linked with the lever 34 rotatably supported by the shaft 37 and rotates with the arm which in turn rotates about the shaft 37. The cam grooves 39a, 40a, 41a, 42a of the blades are so shaped that the aperture is covered by the extended blades when the first blade 31 is positioned above the aperture in the illustration and all the blades substantially overlap mutually when the first blade 31 is retracted below the aperture. In this manner the third, fourth and fifth blades 40, 41, 42 perform fan-like rotary movement about the shaft 38. Also in such shutter with rotary blades, the prevention of light leakage and the reduction in weight can be achieved by forming a flat area and a recessed area, for example 31a and 31b on each face of the blade in such a manner that said recessed area is always positioned corresponding to the flat area on the opposite face.

FIGS. 4A to 4C' illustrate different forms of recessed areas on the blade adapted for use in a square focal plane shutter. The blade shown in FIG. 4A is similar to that shown in FIG. 1, wherein a recessed area 101c on a face and a recessed area 101a on the other face do not mutually overlap but are mutually separated by a partition 101g formed in the thickness direction of the blade. The recessed areas 101a, 101c are thus surrounded by flat areas 101b, 101d and rims 101e, 101f of the same level as that of said flat areas. In FIGS. 4B, and 4B' the recessed areas 201a, 201c partly overlap with a width equal to or larger than the width of the flat areas 201b, 201d. In this case the partition 201g across the blade has a stepped form as shown in FIG. 4B' and is therefore more difficult to prepare with an etching process or a milling process than the structure shown in FIG. 1A, but allows achievement of a large reduction in mass. The difficulty in the preparation of the recessed areas shown in FIG. 4B can be prevented by a structure with shallower recessed areas as shown in FIG. 4C. Such structure only provides a limited amount of weight reduction but is effective for cost reduction since the amount of weight reduction is less but the time required for weight reduction for example with an etching process can be significantly reduced in comparison with the cases shown in FIGS. 4A and 4B, without affecting the light tightness. Also in the structures shown in FIGS. 4B, 4B', 4C and 4C', the recessed areas 201a, 201c; 301a, 301c are respectively surrounded by rims 201e, 201f; 301e, 301f of a same level as that of the flat areas.

FIG. 5 shows another embodiment of the recessed areas in the blade for use in a square focal plane shutter similar to that shown in FIG. 1. The blades are provided, on one face thereof, with flat areas 401d, 402d, 403d and recessed areas 401c, 402c, 403c which are divided into a honeycomb pattern. On the other face there are formed flat areas 401b, 402b, 403b and honeycomb patterned recessed areas 401a, 402a, 403a. Said honeycomb shaped ribs provide a strength the same as that of the thicker rim portions of the blades and reduce bending, thus improving the flatness of the blades. Said honeycomb rib pattern may naturally be replaced by triangular or rectangular rib patterns.

Figure 6:
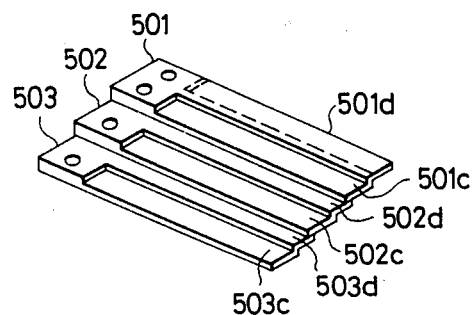
FIGS. 6 and 7 are perspective views respectively of fourth and fifth embodiments of the present invention.
Figure 7:
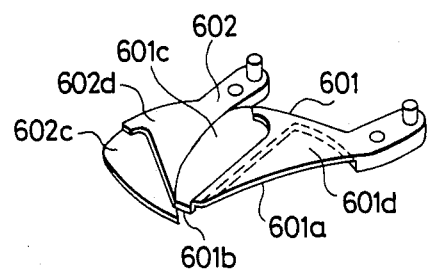

FIG. 6 shows blades 501, 502, 503 for a square focal plane shutter having step-shaped recessed areas 501c, 502c, 503c without surrounding rims, wherein similar step-shaped recessed areas are formed on the opposite face corresponding to the flat areas 501d, 502d, 503d. The above-described structure somewhat lacks the flatness, thus occasionally lacking smooth blade movement, but is capable of achieving a reduced weight without affecting the light tightness. Such blades with step-shaped recessed areas can also be applied to a lens shutter or an automatic diaphragm as shown in FIG. 7. Although FIG. 7 shows only two blades 601 and 602, a ring-shaped structure is naturally realized with a plurality of similar blades. As shown in FIG. 7, the blades are provided with step-shaped recessed areas 601c, 602c and a similar step-shaped recessed area 601a corresponding to a flat area 601d, wherein the flat areas 601b, 602d are in mutual overlapping contact.

Figure 8:
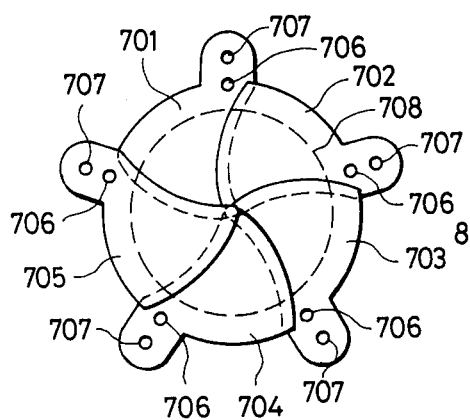
FIG. 8 is a plan view of a conventional lens shutter.
Figure 9:
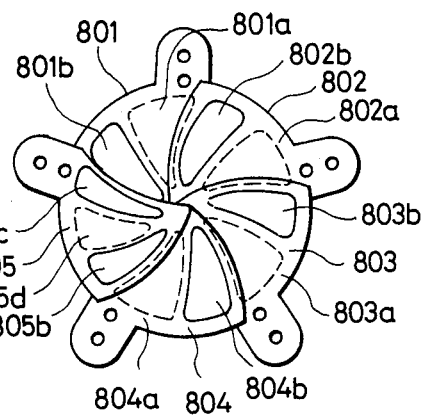
FIG. 9 is a plan view of a sixth embodiment of the present invention.

FIG. 8 shows the blade structure of a conventional lens shutter, while FIG. 9 shows another embodiment in which the blades of the present invention are applied to said conventional lens shutter. In FIG. 8 blades 701-705 of a same shape are rotatably supported by shafts 706 and can be rotated clockwise about said shafts by means of pins 707 respectively fixed on said blades thereby being retracted from the aperture 708 to form an opening. FIG. 8 shows a state in which said aperture is closed. In such structure, if the blade thickness is reduced over the entire area of each blade except the rim portion thereof, the blades will develop extreme bending because of the internal stress, thus resulting in an increased friction resistance of the blades and in a deteriorated light tightness due to incomplete contact between the blades. In the structure shown in FIG. 9, however, the blades are recessed on both faces but mutually overlap in flat areas thereof where such recesses are not present. Blades 802, 803 and 804 mutually overlap in a similar manner and are respectively provided with flat areas 802a, 803a, 804a on top faces thereof contacting flat areas on bottom faces of other blades. The recessed areas 802b, 803b, 804b on top faces are of approximately the same area as that of the recessed areas on bottom faces represented by broken lines. A blade 801 is positioned in parts thereof under adjacent blades 802, 805, while the blade 805 is positioned in parts thereof on adjacent blades 801, 804. Consequently the recessed area 801b on the top face of the blade 801 is made smaller than the recessed areas 802b, 803b, 804b of the blades 802, 803, 804 in order to increase the overlapping contact area with the blade 805. Also the blade 805 is provided with two recessed areas 805b, 805c on the top face thereof and a recessed area 805d at the center of the bottom face thereof, as shown in FIG. 9. Naturally each recessed area corresponds to a flat area formed on the opposite face. In this manner it is possible to reduce the weight of blades sufficiently while reducing the bending caused by the weight reduction. In case of the blades for a diaphragm, the blade 705 shown in FIG. 8 need not be placed at the uppermost position but can be combined with neighboring blades in the same manner as in other blades, since the aperture need not be totally closed in this case. Consequently the blades 801 and 805 in FIG. 9 can be provided with the recessed areas in the same manner as in the blades 802-804.

Figure 10:
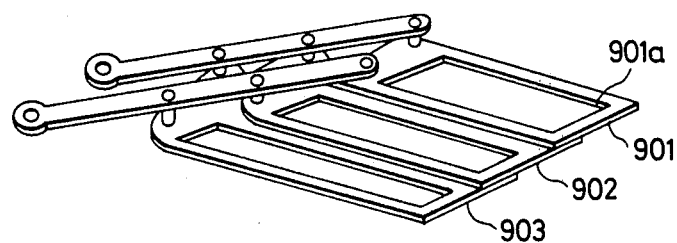
FIGS. 10 and 11 are perspective views respectively of seventh and eighth embodiments of the present invention.

FIG. 10 shows another embodiment of the present invention, wherein a blade 901 is provided with a recessed area 901a only on the top face thereof, while second and third blades 902, 903 have recessed areas both on the top and bottom faces in the same manner as explained in the foregoing.

Such structure also enables the prevention of light leakage and the weight reduction of blades, since the blade 901 is only in contact, at the bottom face thereof, with the second blade. The weight reduction of said first blade 901 is effective for reducing the driving force, since the amount of movement of said first blade 901 is larger than that of other blades.

Figure 11:
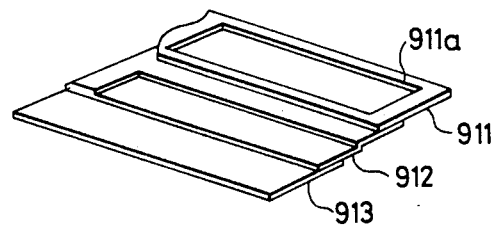

FIG. 11 shows still another embodiment of the present invention, employing an intermediate blade 912 provided with recessed areas on both faces as explained in the foregoing, between an aperture-defining first blade 911 and a third blade 913. Multiple blades 912 may be employed as an intermediate blade group, in case the structure contains more than three blades.

Figure 12A:
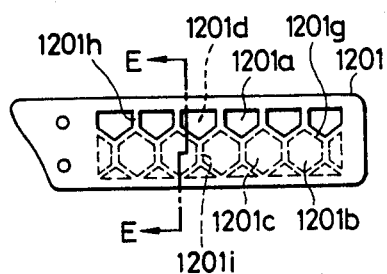
FIG. 12A is a plan view of a ninth embodiment of the present invention.
Figure 12B:
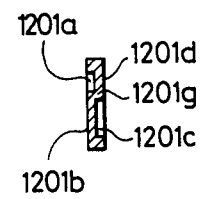
FIG. 12B is a cross-sectional view thereof along a line E—E.

FIGS. 12A and 12B show still another embodiment representing an improvement over the embodiment shown in FIG. 5. A blade 1201 is provided, on a face thereof, with plural recessed areas 1201a of pentagonal or half-cut hexagonal shape, of which neighboring sides of adjacent areas are substantially parallel in the height direction of the blade, thus defining therebetween rims 1201h of the same level as that of a flat area 1201b. On the bottom face of the blade 1201 are formed a flat area 1201d corresponding to said recessed areas 1201a and plural recessed areas 1201c of hexagonal shape corresponding to the flat area 1201b. Neighboring sides of adjacent recesses 1201c are mutually parallel to define rims 1201i of a same level as that of the flat area 1201d. The rims 1201h on the top face and the rims 1201i on the bottom face are in mutually interlocking positions because of the following reason. If said rims 1201h, 1201i are in mutually corresponding positions on top and bottom faces, the recessed areas 1201a, 1201c as well as the rims 1201h, 1201i are arranged at the same pitch, thus causing a bend in the blade or eventually leading to a crack or a break in said recessed areas 1201a, 1201c. On the other hand, in the interlocking arrangement mentioned above, such drawbacks appear less often because the positions of the recessed areas and the rim on top and bottom faces do not mutually coincide. Also because the recessed areas 1201a on top face and those 1201c on bottom face are in such mutually interlocking positions, the partition 1201g extends in zigzag form along the longitudinal direction of the blade. Consequently it is rendered possible to reduce an unbalance in the rigidity in a particular direction of the blade or the bending tendency, and to improve the light tightness while preventing the concentration of stress.

As explained in the foregoing, the light shield blade of the present invention allows maximum weight reduction while maintaining satisfactory light tightness, and provides a very low frictional resistance ensuring smooth movement of the blades due to reduced bending, in combination with a mechanical strength comparable to that in the conventional blades without thickness reduction. Also the light control device of the present invention can be applied to a shutter or an automatic diaphragm of a high speed not achievable with the conventional devices.

We claim:

1. In a shutter apparatus having a plurality of successively overlapping light shielding blades adapted to be disposed across a light path of an optical apparatus, each blade having a pair of opposite faces, and means for driving said blades between a closing position in which said blades are extended to close said light path and an opening position in which said blades are retracted to open said light path, the improvement wherein at least two successive blades have adjacent faces with overlapping areas thereof in the closing position of the blades that are substantially planar and non-recessed, and wherein at least one of said two successive blades is recessed over an area of its adjacent face away from said overlapping areas and is also recessed over an area of its remaining face substantially opposite to said overlapping areas.

2. A shutter apparatus according to claim 1, wherein the other of said two successive blades is recessed over an area of at least one of its faces.

3. A shutter apparatus according to claim 1, wherein the other of said two successive blades is recessed over an area of its adjacent face away from said overlapping areas and is also recessed over an area of its remaining face substantially opposite to said overlapping areas.

4. A shutter apparatus according to claim 1, wherein said adjacent faces are substantially planar and non-recessed beyond said overlapping areas so that the overlapping areas remain substantially planar and non-recessed as the blades commence to retract from said closing position.

5. A shutter apparatus according to claim 1, wherein the recessed areas of said one blade do not overlap each other.

6. A shutter apparatus according to claim 1, wherein the recessed areas of said one blade partially overlap each other.

7. A shutter apparatus according to claim 1, wherein at least one of said recessed areas comprises a plurality of separate recesses arranged according to a predetermined pattern.

8. A shutter apparatus according to claim 1, wherein at least one of said recessed areas is surrounded by a rim disposed in substantially the same plane as the non-recessed area of the face in which said one recessed area is formed.

9. A shutter apparatus according to claim 1, wherein each recessed area on said one blade is opposite to a substantially planar and non-recessed area on said one blade.

10. In a shutter apparatus having a light shielding blade group including at least first, second, and third successively overlapping light shielding blades adapted to be disposed across a light path of an optical device, each blade having a pair of opposite faces, and means for driving said blade group between a closing position in which the blades are extended to close the light path and an opening position in which the blades are retracted to open the light path, the improvement wherein adjacent faces of said first and second blades and adjacent faces of said second and third blades have overlapping areas in said closing position that are substantially planar and non-recessed and wherein each face of the second blade has a recessed area substantially opposite to one of said overlapping areas on the other face of the second blade.

11. A shutter apparatus according to claim 10, wherein an entire overlapping area of at least one of the first and third blades is substantially planar and non-recessed.

12. A shutter apparatus according to claim 10, wherein at least one of the first and third blades has a recessed area on its remaining face substantially opposite to the overlapping area on its adjacent face.

13. A shutter apparatus according to claim 10, wherein the recessed areas of the second blade do not overlap each other.

14. A shutter apparatus according to claim 10, wherein the recessed areas of the second blade partially overlap each other.

15. A shutter apparatus according to claim 10, wherein the recessed area on at least one face of the second blade comprises a plurality of spaced recesses arranged in accordance with a predetermined pattern.

16. A shutter apparatus according to claim 10, wherein the recessed area on at least one face of the second blade is surrounded by a rim disposed in substantially the same plane as the non-recessed area on the same face.

17. In a light shielding apparatus comprising a plurality of light shielding blades adapted to be disposed across a light path of an optical apparatus, the blades being supported pivotally at predetermined positions on the periphery of the light path to form an aperture and being overlapped successively in a manner permitting the size of the aperture to be varied, each blade having a pair of opposite faces, the improvement wherein at least one of two successive blades has first and second areas constituting one face of said one blade, the first area being a substantially planar non-recessed area that overlaps the other of said two successive blades when the size of the aperture is substantially minimized, and the second area being recessed, the other face of said one blade being constituted by third and fourth areas, the third area being a substantially planar non-recessed area that is substantially opposite to said second area, and the fourth area being recessed, and wherein the other of said two successive blades has a substantially planar non-recessed area that is adjacent to said first area of said one blade when the size of said aperture is substantially minimized.

18. A light shielding apparatus according to claim 17, wherein said first and second areas are substantially equal areas.

* * * * *